Patented Dec. 22, 1953

2,663,705

UNITED STATES PATENT OFFICE 2,663,705

PHOSPHORIC ACID DERIVATIVES AND METHODS OF PREPARING THE SAME

Robert P. Parker, Somerville, Doris R. Seeger, Bound Brook, and Erwin Kuh, New Brunswick, N. J., assignors to American Cyanamid Company, New York, N. Y., a corporation of Maine No Drawing. Application July 25, 1951, Serial No. 238,582

1 Claim. (Cl. 260—247.5)

This invention relates to the preparation of new organic compounds. More particularly, it relates to phosphoric acid triamides and methods for their preparation.

It is known in the prior art to prepare phosphoric acid triamide and its N,N',N''-trialkyl-, triaralkyl-, triaryl- and tripentamethylene-substituted derivatives (G. M. Kosolopoff, Organophosphorous Compounds, 1950, pages 312–315).

The compounds of the present invention, in contrast to those of the prior art, are N-substituted N',N''-diethylenephosphoric triamides which may contain certain substituents on a ring carbon atom of the ethylenimine rings. They may be represented by the following formula:

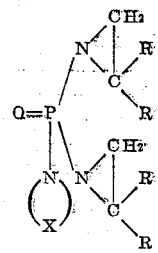

in which R represents hydrogen and a radical of the aliphatic, aliphatic-aromatic or aromatic series and X represents the atom of a divalent organic group, containing at least four carbon atoms, necessary to complete the ring of a secondary heterocyclic amine.

The compounds of the present invention possess chemically reactive ethylenimine rings making them useful as textile chemicals; they may be polymerized to yield new plastics.

The compounds of the present invention are, in general, low melting solids to viscous liquids. While some of the lower members are water-soluble; as a class they are soluble in organic solvents and the higher members of the series possess marked lipid-solubility.

These compounds are prepared by starting with a trihalophosphoric acid such as phosphorous oxychloride or phosphorous oxybromide which is first reacted with a molecular equivalent of a saturated heterocyclic compound containing a secondary amino group in the heterocyclic ring. This intermediate monoamidodihalophosphoric acid is then reacted with two molecular equivalents of an ethylenimine compound to produce the desired phosphoric acid triamides of the present invention. These reactions may be illustrated by the following general equations:

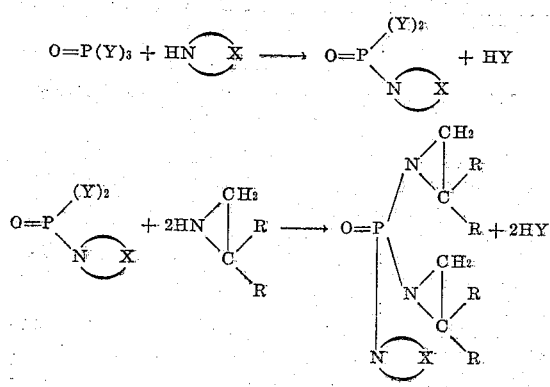

in which Y is chlorine or bromine and R and X are as previously defined. In this reaction the saturated heterocyclic amine may be an amine such as piperidine; 4-methylpiperidine; pyrrolidine; morpholine; thiamorpholine; 1-methylpiperazine; 1,2,3,4-tetrahydroisoquinoline; 1,2,3,4-tetrahydroquinoline and the like. The ethylenimines used in the second step may be compounds such as ethylenimine itself or C-substituted ethylenimines such as 2-methylethylenimine; 2,2-dimethylethylenimine; 2-ethylethylenimine; 2-propylethylenimine; 2-hexylethylenimine; 2,2-diethylethylenimine; 2-propyl - 2 - phenylethylenimine; 2-phenylethylimine. These ethylenimine intermediates may be prepared by known procedures such as by ring closure with an alkali metal hydroxide of the corresponding 2-haloethylamine or sulfuric ester of the corresponding 2-hydroxyethylamine.

The reaction to prepare the compounds of the present invention is preferably carried out in an organic solvent such as benzene, ether, dioxane, and the like in the presence of a tertiary amine as acid acceptor such as triethylamine, N-ethylmorpholine or pyridine. The reaction can also be carried out in aqueous solution, and under these circumstances, the acid acceptor may be an alkaline substance such as an alkali metal carbonate or bicarbonate. The reaction is generally carried out at a temperature within the range of 0° C. to about 60° C. At this temperature range the reaction is generally complete within a period of a few minutes up to several hours. Isolation of the product from organic medium may be accomplished by filtration of the tertiaryamine hydrochloride salt and crystallization from the organic solvent or by evaporation of the organic solvent. If prepared in aqueous medium, some members may be isolated by filtration, others must be extracted from the aqueous solution by the use of organic solvents. The procedure will vary with the individual members according to their solubility properties.

The following examples illustrate the preparation of the phosphoramides of the present invention. All parts are by weight unless otherwise indicated.

EXAMPLE 1

*N-pentamethylene-N',N''-diethylenephosphoric triamide*

A solution of 38 parts of N-(pentamethylene) amidodichlorophosphoric acid in 188 parts of dry benzene is added slowly to a mixture of 18.8 parts of ethylenimine, 41.4 parts of triethylamine and 188 parts of dry benzene at 5–10° C. The reaction mixture is stirred for an additional three hours without cooling, after which the triethylamine hydrochloride is filtered off. The benzene is removed under reduced pressure and the product distilled at 99° at 0.075 mm. of mercury.

EXAMPLE 2

*N-(3-oxapentamethylene)-N',N''-diethylenephosphoric triamide*

N - (3 - oxapentamethylene)amidodichlorophosphoric acid is prepared by refluxing 24.7 parts of morpholine hydrochloride with 92 parts of phosphorous oxychloride for nine hours and then fractionating under reduced pressure. The liquid product boils at 109°–109.5° at 0.40–0.41 mm. of mercury.

A solution of 34.8 parts of N-(3-oxapentamethylene)-amidodichlorophosphoric acid in 172 parts of dry benzene is added slowly to a mixture of 17.1 parts of ethylenimine, 37.6 parts of triethylamine and 172 parts of dry benzene at 5°–10° C. Agitation is continued for an additional three hours without cooling, after which the triethylamine hydrochloride is filtered off. The benzene is removed under reduced pressure and the residue crystallizes on cooling. After two recrystallizations from dry benzene an analytically pure product is obtained which melts at 62.5°–64.5° C.

EXAMPLE 3

*N - pentamethylene - N',N'' - bis(1 - methylethylene)-phosphoric triamide*

A solution of 19 parts of N-(pentamethylene)-amidodichlorophosphoric acid in 95 parts of dry benzene is added slowly to a mixture of 12.4 parts of 2-methylethylenimine, 20.7 parts of triethylamine and 95 parts of dry benzene at 5°–10° C. The reaction mixture is stirred for an additional three hours without cooling after which the triethylamine hydrochloride is filtered off. The benzene is removed under reduced pressure and the product is obtained as an oil which crystallizes on cooling.

EXAMPLE 4

*N - pentamethylene - N',N'' - bis(1,1 - dimethylethylene)-phosphoric triamide*

A solution of 19 parts of N-(pentamethylene)-amidodichlorophosphoric acid in 95 parts of dry benzene is added slowly to a mixture of 15.5 parts of 2,2-dimethylethylenimine, 20.7 parts of triethylamine and 95 parts of dry benzene at 5°–10° C. The reaction mixture is stirred for an additional three hours without cooling, after which the triethylamine hydrochloride is filtered off. The benzene is removed under reduced pressure and the product is obtained as a heavy syrup.

We claim:

N - (3 - oxapentamethylene) - N',N'' - diethylenephosphoric triamide having the formula:

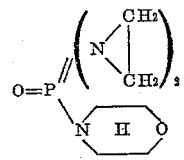

ROBERT P. PARKER.
DORIS R. SEEGER.
ERWIN KUH.

References Cited in the file of this patent

UNITED STATES PATENTS

| Number | Name | Date |
|---|---|---|
| 1,990,609 | Meis | Feb. 12, 1930 |
| 2,146,584 | Lipkin | Feb. 7, 1939 |
| 2,160,841 | Dreyfus | June 6, 1939 |
| 2,502,478 | Padbury | Apr. 4, 1950 |

OTHER REFERENCES

Andrieth, J. Am. Chem. Soc., July 1942, pp. 1553–1555.

Kosolapoff, "Organophosphorus Compounds," pp. 278, 279, 280 and 281 (1950).

Geschickter, J. A. M. A., February 1, 1930, P. O. S. L., pp. 326–328.

J. A. M. A., vol. 94, No. 23, pp. 1845, 1864, 1865, P. O. S. L., June 7, 1930.

Kaplan, Am. J. Cancer, January 1932, pp. 210–213.